United States Patent
Patnoe (10) Patent No.: US 9,189,467 B1
(45) Date of Patent: Nov. 17, 2015

(54) METHOD AND APPARATUS FOR ANNOTATING AN ELECTRONIC DOCUMENT

(75) Inventor: Christopher D. Patnoe, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 2828 days.

(21) Appl. No.: 10/045,906

(22) Filed: Nov. 7, 2001

(51) Int. Cl.
  *G06F 17/00* (2006.01)
  *G06F 17/24* (2006.01)
  *G06F 17/30* (2006.01)

(52) U.S. Cl.
  CPC ........ *G06F 17/241* (2013.01); *G06F 17/30115* (2013.01)
  USPC ............ 715/230; 715/200; 715/255; 715/268

(58) Field of Classification Search
  CPC .............. G06F 17/241; G06F 17/3007; G06F 17/30115; G06F 17/30129; G06F 3/0643
  USPC ......... 715/522, 512, 523, 530, 230, 248, 249, 715/255, 200, 268
  See application file for complete search history.

(56) References Cited

U.S. PATENT DOCUMENTS

| | | | |
|---|---|---|---|
| 4,555,775 A | 11/1985 | Pike | |
| 4,686,522 A | 8/1987 | Hernandez et al. | |
| 4,783,648 A | 11/1988 | Homma et al. | |
| 4,823,281 A | 4/1989 | Evangelisti et al. | |
| 4,827,253 A | 5/1989 | Maltz | |
| 4,868,765 A | 9/1989 | Diefendorff | |
| 4,914,607 A | 4/1990 | Takanashi et al. | |
| 4,954,970 A | 9/1990 | Walker et al. | |
| 4,959,803 A | 9/1990 | Kiyohara et al. | |
| 4,974,196 A | 11/1990 | Iwami et al. | |
| 4,992,781 A | 2/1991 | Iwasaki et al. | |
| 5,119,476 A | 6/1992 | Texier | |
| 5,124,691 A | 6/1992 | Sakamoto et al. | |
| 5,157,384 A | 10/1992 | Greanias et al. | |
| 5,185,808 A | 2/1993 | Cok | |
| 5,233,686 A | 8/1993 | Rickenbach et al. | |
| 5,252,951 A | 10/1993 | Tannenbaum et al. | |
| 5,260,697 A | 11/1993 | Barrett et al. | |
| 5,265,202 A | 11/1993 | Krueger et al. | |
| 5,283,560 A | 2/1994 | Bartlett | |
| 5,283,867 A | 2/1994 | Bayley et al. | |
| 5,307,452 A | 4/1994 | Hahn et al. | |
| 5,313,227 A | 5/1994 | Aoki et al. | |
| 5,313,571 A | 5/1994 | Hirose et al. | |

(Continued)

OTHER PUBLICATIONS

Adobe Acrobat 5, www.adobe.com/products/acrobat/adobepdf.html; Sep. 24, 2001; pp. 1-2.

(Continued)

*Primary Examiner* — Thu Huynh (74) *Attorney, Agent, or Firm* — Schwegman Lundberg & Woessner, P.A.

(57) ABSTRACT

A method and apparatus to mark-up an electronic document (i.e., a second electronic document) that is superimposed on a first electronic document keeping the first electronic document unchanged. The second electronic document is optionally viewed concurrently with the first electronic document. The second electronic document is capable of being viewed or modified using different application programs so long as the different application programs process the format used by the second electronic document. The second electronic document is saved as a separate document independent of the first electronic document.

30 Claims, 4 Drawing Sheets

(56) References Cited

U.S. PATENT DOCUMENTS

| | | | |
|---|---|---|---|
| 5,333,255 A | 7/1994 | Damouth | |
| 5,351,067 A | 9/1994 | Lumelsky et al. | |
| 5,367,453 A | 11/1994 | Capps et al. | |
| 5,425,137 A | 6/1995 | Mohan et al. | |
| 5,425,141 A | 6/1995 | Gedye | |
| 5,463,726 A | 10/1995 | Price | |
| 5,463,728 A | 10/1995 | Blahut et al. | |
| 5,467,441 A | 11/1995 | Stone et al. | |
| 5,467,443 A | 11/1995 | Johnson et al. | |
| 5,469,540 A | 11/1995 | Powers, III et al. | |
| 5,469,541 A | 11/1995 | Kingman et al. | |
| 5,475,812 A | 12/1995 | Corona et al. | |
| 5,491,495 A | 2/1996 | Ward et al. | |
| 5,524,190 A * | 6/1996 | Schaeffer et al. | 715/522 |
| 5,559,942 A | 9/1996 | Gough et al. | |
| 5,581,243 A | 12/1996 | Ouellette et al. | |
| 5,581,670 A | 12/1996 | Bier et al. | |
| 5,590,265 A | 12/1996 | Nakazawa | |
| 5,596,690 A | 1/1997 | Stone et al. | |
| 5,617,114 A * | 4/1997 | Bier et al. | 345/634 |
| 5,638,501 A | 6/1997 | Gough et al. | |
| 5,651,107 A | 7/1997 | Frank et al. | |
| 5,652,851 A | 7/1997 | Stone et al. | |
| 5,729,704 A | 3/1998 | Stone et al. | |
| 5,798,752 A | 8/1998 | Buxton | |
| 5,798,844 A * | 8/1998 | Sakano et al. | 358/405 |
| 5,813,009 A * | 9/1998 | Johnson et al. | 707/100 |
| 5,818,455 A | 10/1998 | Stone et al. | |
| 5,831,615 A | 11/1998 | Drews et al. | |
| 5,895,475 A | 4/1999 | Eisenberg | |
| 5,949,432 A | 9/1999 | Gough et al. | |
| 5,959,626 A * | 9/1999 | Garrison et al. | 345/784 |
| 6,072,489 A * | 6/2000 | Gough et al. | 715/803 |
| 6,209,005 B1* | 3/2001 | Harker et al. | 715/501.1 |
| 6,240,414 B1* | 5/2001 | Beizer et al. | 707/8 |
| 6,335,746 B1* | 1/2002 | Enokida et al. | 715/839 |
| 6,499,040 B1* | 12/2002 | Vu et al. | 715/209 |
| 6,551,357 B1* | 4/2003 | Madduri | 715/235 |
| 6,664,979 B1* | 12/2003 | Schofield et al. | 715/735 |
| 6,687,877 B1* | 2/2004 | Sastry et al. | 715/201 |
| 6,859,909 B1* | 2/2005 | Lerner et al. | 715/512 |
| 6,910,184 B1* | 6/2005 | Yano et al. | 715/201 |
| 6,938,030 B1* | 8/2005 | Simone et al. | 707/1 |
| 6,964,013 B1* | 11/2005 | Ono et al. | 715/207 |
| 7,047,487 B1* | 5/2006 | Bates et al. | 715/515 |
| 7,168,048 B1* | 1/2007 | Goossen et al. | 715/797 |
| 7,168,084 B1 | 1/2007 | Hendricks et al. | |
| 7,191,407 B1* | 3/2007 | Kluttz et al. | 715/788 |
| 7,283,064 B2 | 10/2007 | He | |
| 7,505,046 B1 | 3/2009 | Louveaux | |
| 7,752,566 B1 | 7/2010 | Nelson et al. | |
| RE41,922 E | 11/2010 | Gough et al. | |
| 2002/0003897 A1* | 1/2002 | Tanaka | 382/165 |
| 2002/0011990 A1* | 1/2002 | Anwar | 345/173 |
| 2002/0033838 A1* | 3/2002 | Krueger et al. | 345/700 |
| 2002/0073123 A1* | 6/2002 | Tsai | 707/526 |
| 2002/0116399 A1* | 8/2002 | Camps et al. | 707/200 |
| 2002/0151347 A1* | 10/2002 | Jorasch et al. | 463/20 |
| 2002/0167538 A1* | 11/2002 | Bhetanabhotla | 345/700 |
| 2002/0198963 A1* | 12/2002 | Wu et al. | 709/219 |
| 2003/0067630 A1* | 4/2003 | Stringham | 358/1.16 |
| 2003/0110140 A1* | 6/2003 | Morrison et al. | 705/400 |
| 2003/0221167 A1 | 11/2003 | Goldstein et al. | |
| 2004/0090467 A1 | 5/2004 | Bonura et al. | |
| 2005/0091578 A1 | 4/2005 | Madan et al. | |
| 2005/0278585 A1 | 12/2005 | Spencer | |
| 2006/0277467 A1 | 12/2006 | Reponen et al. | |
| 2008/0294981 A1 | 11/2008 | Balzano et al. | |
| 2010/0041442 A1 | 2/2010 | Hong et al. | |
| 2011/0289427 A1 | 11/2011 | Toprani | |

OTHER PUBLICATIONS

Peck, Wendy, "Photoshop Layers: The Freedom Tool", www.webreference.com/graphics/column32; Sep. 24, 2001; pp. 1-4.

Peck, Wendy, "Powerful Photoshop Layers: Working with Layers", www.webreference.com/graphics/column32/2.html; Sep. 24, 2001; pp. 1-6.

Peck, Wendy, "Powerful Photoshop Layers: Linking and Merging Layers" www.webreference.com/graphics/column32/3.html; Sep. 24, 2001; pp. 1-5.

Peck, Wendy, "Powerful Photoshop Layers: Layer Effects Basics", www.webreference.com/graphics/column32/4.html; Sep. 24, 2001; pp. 1-4.

Peck, Wendy, "Powerful Photoshop Layers: Layer Effects Settings", www.webreference.com/graphics/column32/5.html; Sep. 24, 2001; pp. 1-5.

Peck, Wendy, "Powerful Photoshop Layers: Super Power Layer Tools", www.webreference.com/graphics/column32/6.html; Sep. 24, 2001; pp. 1-5.

U.S. Appl. No. 12/785,408, Amendment filed Jul. 17, 2012 in response to Non Final Office Action mailed Apr. 23, 2012, 7 pgs.

U.S. Appl. No. 12/785,408, Final Office Action mailed Niv. 5, 2012, 18 pgs.

U.S. Appl. No. 12/785,408, Non Final Office Action mailed Apr. 23, 2012, 27 pgs.

U.S. Appl. No. 12/785,408, Response filed Mar. 5, 2013 to Final Office Action mailed Nov. 5, 2012, 11 pgs.

U.S. Appl. No. 10/163,748, Amendment and Request for Reconsideration filed May 8, 2009 in Response to Non-Final Office Action mailed Feb. 9, 2009, 8 pgs.

U.S. Appl. No. 10/163,748, Amendment and Request for Reconsideration filed Oct. 17, 2008 in Response to Final Office Action mailed Apr. 18, 2008, 28 pgs.

U.S. Appl. No. 10/163,748, Final Office Action mailed Apr. 18, 2008, 27 pgs.

U.S. Appl. No. 10/163,748, Interview Summary and Advisory Action mailed Oct. 28, 2008, 4 pgs.

U.S. Appl. No. 10/163,748, Interview Summary and Supplemental Amendment filed Jun. 5, 2009, 6 pgs.

U.S. Appl. No. 10/163,748, Interview Summary mailed Jan. 16, 2007, 1 pg.

U.S. Appl. No. 10/163,748, Interview Summary mailed Nov. 6, 2007, 1 pg.

U.S. Appl. No. 10/163,748, Non-Final Office Action mailed Jan. 22, 2010, 4 pgs.

U.S. Appl. No. 10/163,748, Non-Final Office Action mailed Feb. 9, 2009, 11 pgs.

U.S. Appl. No. 10/163,748, Non-Final Office Action mailed Jun. 18, 2003, 32 pgs.

U.S. Appl. No. 10/163,748, Non-Final Office Action mailed Aug. 30, 2007, 23 pgs.

U.S. Appl. No. 10/163,748, Non-Final Office Action mailed Oct. 26, 2006, 15 pgs.

U.S. Appl. No. 10/163,748, Notice of Allowance mailed Jul. 28, 2010, 6 pgs.

U.S. Appl. No. 10/163,748, Reply filed Feb. 19, 2010 to Non-Final Office Action mailed Jan. 22, 2010, 34 pgs.

U.S. Appl. No. 10/163,748, Request for Continued Examination filed Nov. 17, 2008, 12 pgs.

U.S. Appl. No. 10/163,748, Request for Reconsideration filed Jan. 26, 2007 in Response to Non-Final Office Action mailed Oct. 26, 2006, 49 pgs.

U.S. Appl. No. 10/163,748, Request for Reconsideration filed Aug. 1, 2003 in Response to Non-Final Office Action mailed Jun. 18, 2003, 18 pgs.

U.S. Appl. No. 10/163,748, Request for Reconsideration filed Nov. 13, 2007 in Response to Non-Final Office Action mailed Aug. 30, 2007, 55 pgs.

U.S. Appl. No. 10/163,748, Supplemental Amendment filed Nov. 30, 2009, 6 pgs.

U.S. Appl. No. 12/437,500, Advisory Action mailed Sep. 14, 2011, 3 pgs.

U.S. Appl. No. 12/437,500, Amendment filed Feb. 28, 2011 in Reply to Non-Final Office Action mailed Oct. 27, 2010, 12 pgs.

U.S. Appl. No. 12/437,500, Amendment filed Aug. 18, 2010 in Reply to Non-Final Office Action mailed Mar. 19, 2010, 12 pgs.

(56) References Cited

OTHER PUBLICATIONS

U.S. Appl. No. 12/437,500, Amendment filed Aug. 31, 2011 in Reply to Final Office Action mailed Mar. 31, 2011, 16 pgs.
U.S. Appl. No. 12/437,500, Final Office Action mailed Mar. 31, 2011, 18 pgs.
U.S. Appl. No. 12/437,500, Non-Final Office Action mailed Mar. 19, 2010, 11 pgs.
U.S. Appl. No. 12/437,500, Non-Final Office Action mailed Jun. 6, 2012, 19 pgs.
U.S. Appl. No. 12/437,500, Non-Final Office Action mailed Oct. 27, 2010, 12 pgs.
U.S. Appl. No. 12/437,500, Notice of Allowance mailed Jan. 23, 2013, 5 pgs.
U.S. Appl. No. 12/437,500, Notice of Panel Decision mailed Oct. 11, 2011, 2 pgs.
U.S. Appl. No. 12/437,500, Preliminary Amendment filed May 7, 2009, 20 pgs.
U.S. Appl. No. 12/437,500, Response filed Dec. 6, 2012 to Non-Final Office Action mailed Jun. 6, 2012, 14 pgs.
U.S. Appl. No. 12/437,500, Submission and Request for Continued Examination filed Apr. 28, 2012, 21 pgs.
U.S. Appl. No. 12/785,408, Examiner Interview Summary mailed Jul. 5, 2012, 4 pgs.
U.S. Appl. No. 12/785,408, Final Office Action mailed Dec. 18, 2014, 28 pgs.
U.S. Appl. No. 12/785,408, Response filed Aug. 27, 2014 to Non Final Office Action mailed Mar. 27, 2014, 14 pgs.

* cited by examiner

METHOD AND APPARATUS FOR ANNOTATING AN ELECTRONIC DOCUMENT

FIELD OF THE INVENTION

The present invention relates generally to computer systems. More particularly, this invention relates to application programs for computer systems.

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 2000, Apple Computer, Inc., All Rights Reserved.

BACKGROUND

As the use of computers and the Internet have proliferated, so too has the use of application programs. A multitude of application programs exist for performing tasks such as word processing, accounting, graphic art, etc. In addition, there are numerous platforms or operating systems on which these application programs operate. For example, Apple® Macintosh® machines may use the Mac OS X operating system and support Microsoft's Word X for word processing, whereas Compaq® machines may use the Microsoft Windows operating system and support Microsoft word for word processing.

There are application programs that enable a user to provide a note (e.g., an annotation, a drawing, etc.) in another application program (e.g., a word processing document). The note is displayed over part of the text and images of the word processing document. (see U.S. Pat. No. 5,559,942 issued to Gough et al. of Apple Computer Inc., of Cupertino Calif.). The note provides a useful means for a user to annotate the underlying word processing document and is displayed using an anchor object in the word processing document.

The notes described in U.S. Pat. No. 5,559,942 are not separable from the document in which they appear. Moreover, a document that includes the notes created on a machine with a particular operating system may not be viewed on another machine with a different operating system. What is needed, therefore, is a method and apparatus to mark-up an electronic document (i.e., a second electronic document) that is superimposed on a first electronic document (e.g., a word processing document) keeping the first electronic document unchanged. The second electronic document is optionally viewed concurrently with the first electronic document, and the second electronic document is capable of being viewed or modified using different application programs so long as the different application programs process the format used by the second electronic document. The second electronic document is saved as a separate document independent of the first electronic document. Furthermore, the application programs that permit the second electronic document to be viewed or modified may be operational on machines that use the same operating system as the machine that created the second electronic document. Alternately, the application programs that permit the second electronic document to be viewed or modified may be operational on machines that use a different operating system so long as the application programs process the format of the second electronic document.

SUMMARY OF THE INVENTION

A method and apparatus to mark-up an electronic document (i.e., a second electronic document) that is superimposed on a first electronic document (e.g., a word processing document) keeping the first electronic document unchanged. The second electronic document is optionally viewed concurrently with the first electronic document. The second electronic document is capable of being viewed or modified using different application programs so long as the different application programs process the format used by the second electronic document. The second electronic document is saved as a separate document independent of the first electronic document. Furthermore, the application programs that permit the second electronic document to be viewed or modified may be operational on machines that use the same operating system as the machine that created the second electronic document. Alternately, the application programs that permit the second electronic document to be viewed or modified may be operational on machines that use a different operating system so long as the application programs process the format of the second electronic document.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Described is a method and apparatus to mark-up an electronic document (i.e., a second electronic document) that is superimposed on a first electronic document (e.g., a word processing document) keeping the first electronic document unchanged. The second electronic document is optionally viewed concurrently with the first electronic document. The second electronic document is capable of being viewed or modified using different application programs so long as the different application programs process the format used by the second electronic document. The second electronic document is saved as a separate document independent of the first electronic document. Furthermore, the application programs that permit the second electronic document to be viewed or modified may be operational on machines that use the same operating system as the machine that created the second electronic document. Alternately, the application programs that permit the second electronic document to be viewed or modified may be operational on machines that use a different operating system so long as the application programs process the format of the second electronic document.

In the following description, numerous specific details are set forth in order to provide a thorough understanding of the present invention. It will be apparent, however, to one of ordinary skill in the art that the present invention may be practiced without these specific details. In other instances, well-known architectures, steps, and techniques have not been shown to avoid unnecessarily obscuring the present invention.

Parts of the description may be presented using terminology commonly employed by those skilled in the art to convey the substance of their work to others skilled in the art. Also, parts of the description may be presented in terms of operations performed through the execution of programming instructions. As well understood by those skilled in the art, these operations often take the form of electrical, magnetic, or optical signals capable of being stored, transferred, combined, and otherwise manipulated through, for instance, electrical components.

The invention may utilize a distributed computing environment. In a distributed computing environment, program modules (e.g., the application program) may be physically located in different local and remote memory storage devices. Execution of the program modules may occur locally in a stand-alone manner or remotely in a client/server manner. Examples of such distributed computing environments include local area networks, enterprise-wide computer networks, and the global Internet.

In addition, it should be understood that the programs, processes, method, etc. described herein are not related or limited to any particular computer or apparatus nor are they related or limited to any particular communication network architecture. Rather, various types of general-purpose machines may be used with program modules constructed in accordance with the teachings described herein. Similarly, it may prove advantageous to construct a specialized apparatus to perform the method steps described herein by way of dedicated computer systems in a specific network architecture with hard-wired logic or programs stored in nonvolatile memory such as read only memory.

Various operations will be described as multiple discrete steps performed in turn in a manner that is helpful in understanding the present invention. However, the order of description should not be construed as to imply that these operations are necessarily performed in the order they are presented, or even order dependent. Lastly, repeated usage of the phrase "in one embodiment" does not necessarily refer to the same embodiment, although it may.

Figure 1:
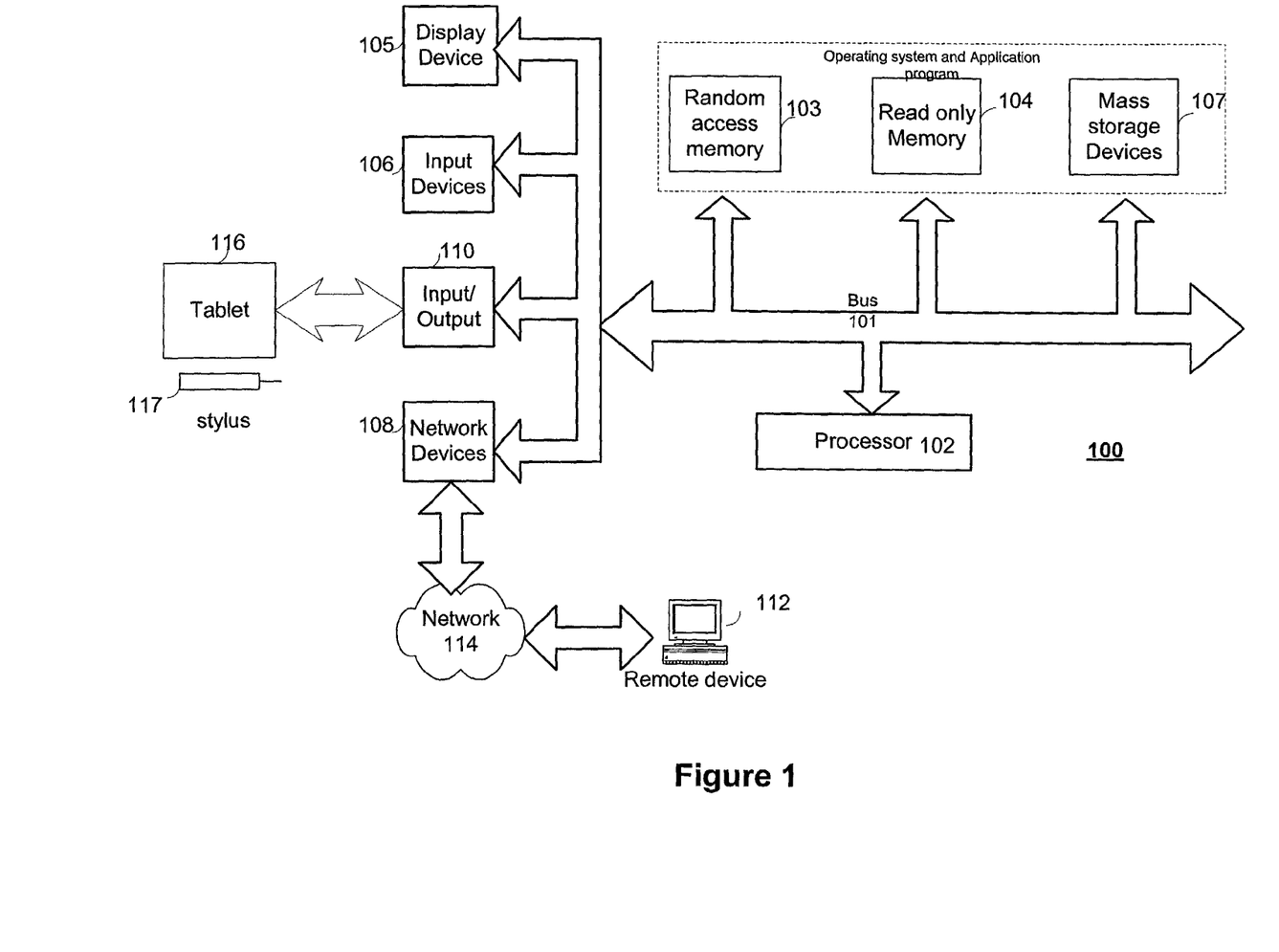
FIG. 1 illustrates a block diagram of a computer system according to one embodiment of the invention.

FIG. 1 illustrates a block diagram of a computer system according to one embodiment of the invention. The computer system 100 illustrated in FIG. 1 is used to store and execute an application program. The application program permits a user to mark-up an electronic document (i.e., a second electronic document) that is superimposed on a first electronic document (e.g., a word processing document) keeping the first electronic document unchanged. In one embodiment, an application program marks up the second electronic document automatically (e.g., by finding and replacing certain data strings in the second electronic document as specified by a user). In one embodiment, the second electronic document may be marked-up without opening the first electronic document (e.g., by indicating the first electronic document by highlighting or pointing to the name of the first electronic document on the desktop or in a directory on the computer screen). The application program permits the user to optionally view the second electronic document concurrently with the first electronic document. In one embodiment, the second electronic document may be superimposed over the first electronic document when the first electronic document is displayed in an annotated mode. For example, the second electronic document may be viewed or displayed independent of the first electronic document; so also, the first electronic document may be viewed or displayed independent of the second electronic document. The second electronic document generated by the application program is capable of being viewed or modified using different application programs so long as the different application programs process the format used by the second electronic document. The second electronic document may be saved as a separate document independent of the first electronic document. Furthermore, the application programs that permit the second electronic document to be viewed or modified may be operational on machines that use the same operating system as the machine that created the second electronic document. Alternately, the application programs that permit the second electronic document to be viewed or modified may be operational on machines that use a different operating system so long as the application programs process the format of the second electronic document.

Although the embodiment of FIG. 1 uses a personal computer to run the application program described above, other devices including wireless devices such as cellular phones and personal digital assistants (PDAs) may also be used to run the application program. One embodiment of the present invention may be implemented using personal computer (PC) architecture. It will be apparent to those of ordinary skill in the art that alternative computer system architectures or other processor, programmable or electronic-based devices may also be employed.

In general, such computer systems as illustrated by FIG. 1 include a processor 102 coupled through a bus 101 to a random access memory (RAM) 103, a read only memory (ROM) 104, and a mass storage device 107. Mass storage device 107 represents a persistent data storage device, such as a floppy disk drive, fixed disk drive (e.g., magnetic, optical, magneto-optical, or the like), or streaming tape drive for storing the application program. Processor 102 may be any of a wide variety of general-purpose processors or microprocessors (such as the 68000 series processor manufactured by Motorola® Corporation), a special purpose processor, or a specifically programmed logic device.

In one embodiment, processor 102 generates an electronic document (i.e., a second electronic document) and permits a user or an application program to mark-up the electronic document that is superimposed on a first electronic document (e.g., a word processing document), keeping the integrity of the first electronic document unchanged. In one embodiment, the second electronic document may be marked-up without opening the first electronic document. The first electronic document may be specified e.g., by specifying the name of the first electronic document by typing the name of the document, or by pointing to the name of the document and selecting the document by clicking a mouse on the name of the document on a desktop or in a directory on a computer screen. The second electronic document is optionally viewed concurrently with the first electronic document. The second electronic document is capable of being viewed or modified using different application programs, so long as the different application programs process the format used by the second electronic document. The second electronic document is saved as a separate document independent of the first electronic document. Furthermore, the application programs that permit the second electronic document to be viewed or modified may be operational on machines that use the same operating system as the machine that created the second electronic document. Alternately, the application programs that permit the second electronic document to be viewed or modified may be operational on machines that use a different operating system so long as the application programs process the format of the second electronic document.

In one embodiment, processor 102 via the application program generates, edits, and saves the second electronic document in standard portable document format (PDF). In one embodiment, the PDF document is created and saved using proprietary tags, however, in alternate embodiments the PDF document may be created and saved without proprietary tags. Using the standard PDF enables the second electronic document to be generated, edited, viewed, and saved using any application that allows the processing of PDF documents. Although the operations on the second electronic document are listed as generating, editing, viewing, and saving, one skilled in the art will appreciate that other operations, such as compression, encryption, decryption etc. may also be performed on the second electronic document. One skilled in the art will appreciate that not all applications need generate, edit, save, or permit the viewing of a PDF document. Some applications may permit the generating, editing, viewing and saving of the PDF document, while other applications may permit just the viewing of the PDF document without permitting modification to the PDF document. The PDF document created may be generated, edited, viewed, and saved on any operating system platform so long as the operating system platform has an application that allows for the processing of PDF documents. Although the description above specifies the use of applications that process files using the standard PDF, one skilled in the art will appreciate that applications that process other formats that permit operations, including but not limited to, generating, editing, viewing, and saving files across different operating systems may alternatively be used to generate the second electronic document.

In one embodiment, the application program that generates the second electronic document comprises a menu bar that includes a suite of tools that enables processor 102 to perform various functions. The suite of tools has a drop-down menu that permits the selection of programs from the drop-down menu. In particular, icons or text in the menu bar launch a program whenever a pointing device (e.g., a mouse) selects the particular icon or text in the menu bar. The menu bar including the suite of tools, may be opened, closed, dragged, and used in any application. In one embodiment, the menu bar including the suite of tools may be dragged into a word-processing document (e.g., a Microsoft® word document), a financial document (e.g., a Microsoft® Excel document) or a graphics document (e.g., a Microsoft® Visio document). When a file from the menu bar is selected (e.g., a new file or an existing file), the file that opens (i.e., the second electronic document) is superimposed on the Word, Excel, or Visio (i.e., the first electronic document) document beneath. Markings such as drawings, handwriting, or text are entered in the second electronic document, keeping the underlying document (i.e., the first electronic document) unchanged.

A program in the suite of tools (e.g., a transparency tool) may be selected to change the transparency of the background of the second electronic document such that the first electronic document is invisible, partially visible or fully visible.

The suite of tools permits the mark-up of the second electronic document using a pointing device such as stylus 117 and tablet 116, a touch sensitive screen (not shown), a keyboard, a mouse, or some other pointing or information entry device.

The suite of tools, via a character recognition tool, recognizes both text and handwriting in the first electronic document and copies parts thereof into the second electronic document. In one embodiment, the parts copied into the second electronic document are parts that are marked for copying by, for example, highlighting, circling, pointing etc. The parts marked for copying are highlighted, in the second electronic document. In one embodiment, since the second electronic document is transparent, the text or items marked for copying are clearly visible in the first electronic document through the second electronic document.

In one embodiment, text or objects that are in the second electronic document may be concatenated. Concatenating the text or objects in the second electronic document facilitates the reading of the concatenated material. In addition, the suite of tools provides a spell-check for the text in the second electronic document.

The application program permit a user to enter text in the second electronic document by typing, copying from another document using cut and paste methods well known in the art, or via a handwriting tool such as a stylus or other input methods. The suite of tools, via a margin tool, permits the creation of one or more margins in the second electronic document. In addition, the suite of tools provides tools to attach audio, video, or audio-video scripts or segments in the second electronic document to correspond with material in the first electronic document. In one embodiment, the audio text is input via a microphone, and the video is input via a camera that is illustrated as input devices 106.

The suite of tools provides tools for changing various parameters in the second electronic document including but not limited to the font type, font size, font color, line color, line shapes, line type, line thickness etc.

In one embodiment the suite of tools allow the second electronic document to be marked-up without opening the first electronic document (e.g., by indicating the first electronic document by highlighting or pointing to the name of the first electronic document on the desktop or in a directory on the computer screen).

In one embodiment the suite of tools permit the user to optionally view the second electronic document concurrently with the first electronic document. In other embodiments, the second electronic document may be superimposed over the first electronic document when the first electronic document is displayed in an annotated mode. For example, the second electronic document may be viewed or displayed independent of the first electronic document; so also, the first electronic document may be viewed or displayed independent of the second electronic document.

Figure 2:
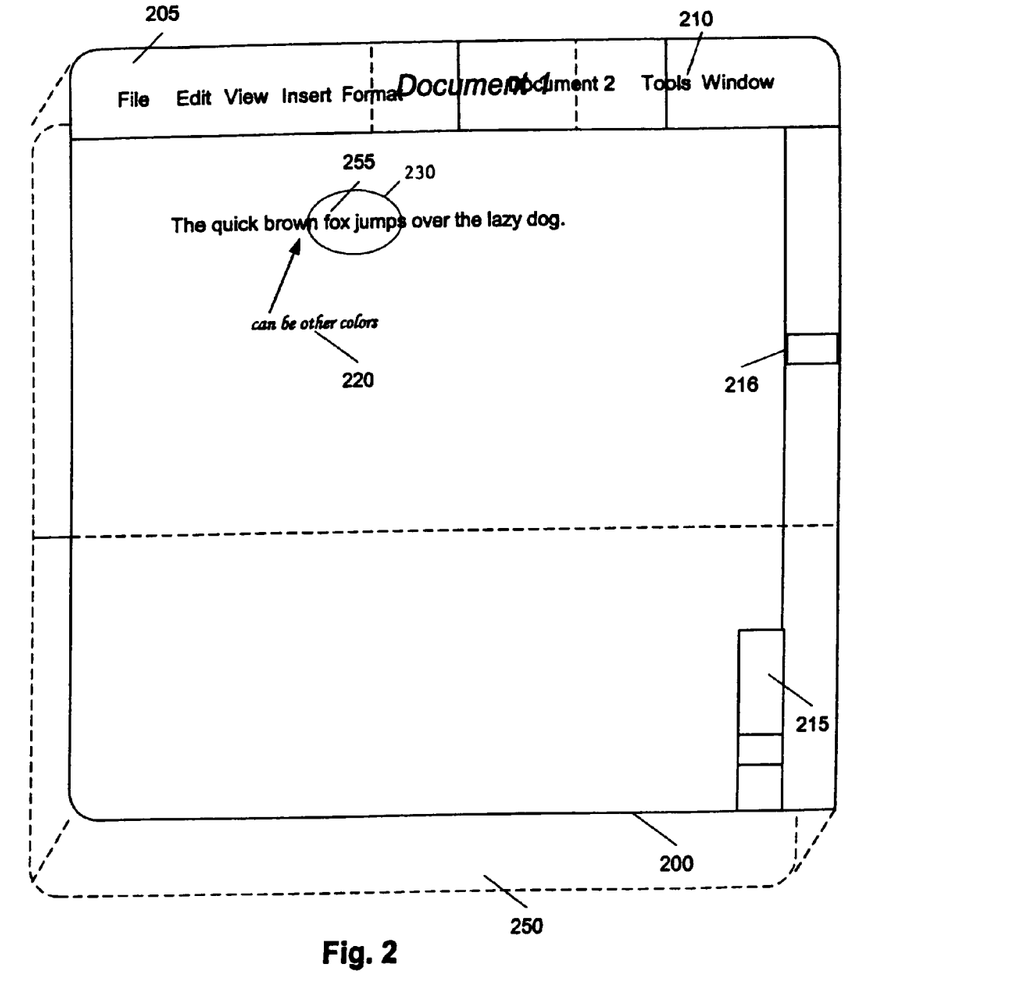
FIG. 2 illustrates a display screen according to one embodiment of the invention.

FIG. 2 illustrates a display screen according to one embodiment of the invention. As illustrated in FIG. 2, display screen 200 of the second electronic document is superimposed upon a text document 250 (the first electronic document). Menu bar 205 includes the suite of tools 210 (e.g., indicated as "Tools" in the menu bar). Menu bar 205 may be opened, closed, dragged, and used in any application. In one embodiment, the transparency of the second electronic document is controlled by slider bar 215 that may be adjusted to allow for the first electronic document to be totally visible (i.e., the background of the second electronic document is totally transparent), for the first electronic document 250 to be invisible (i.e., the background of second electronic document is opaque) or for the visibility of the first electronic document to be controlled by a varying degree.

In one embodiment, markings such as drawings, handwriting, or text are entered in second electronic document 200, keeping the underlying document (the first electronic document) 250 unchanged.

Using an input device e.g., a stylus or a mouse the second electronic document may be marked-up as illustrated in FIG. 2. By keeping the background of the second electronic document transparent or nearly transparent, a stylus or mouse may be used to circle text in the first electronic document, with the markings appearing in the second electronic document. As FIG. 2 illustrates, the text "fox jumps" at 255 is in the first electronic document 250, however, the circling of the text 230 occurs in the second electronic document 200. So also the annotation "can be other colors" at 220 occurs in the second electronic document 200. By marking up the first electronic document such that the markings occur in the second electronic document the first electronic document is unchanged. In one embodiment, the annotation 220 may be typed, handwritten e.g., using a pen or stylus, or copied from another electronic document and pasted in document 200.

In one embodiment, the application program that generates the second electronic document uses the standard PDF to generate the second electronic document. In one embodiment, multiple document pairs may be opened at any given time (e.g., a Word document and the corresponding superimposed second electronic word document, and an excel spreadsheet and the corresponding superimposed second electronic Excel document). Material may be copied from one superimposed second document to another superimposed second document (e.g., from the second electronic Word document to the second electronic Excel document, or from an underlying document to superimposed documents e.g., from the Word document to the second electronic Excel document.

In another embodiment, the association of the documents may be changed e.g., the second electronic Word document that is associated with the Word document may be changed such that the second electronic Excel document may be associated with the Word document.

In one embodiment, the suite of tools, via a scroll bar 216 allows for scrolling the second electronic document, such that, concurrently with the scrolling of the second electronic document the first electronic document optionally scrolls. In addition, the suite of tools permits a user to switch focus i.e., move the first electronic document to the front of the computer screen and move the second electronic document to the background of the computer screen and vice versa.

In FIG. 1 display device 105 is coupled to processor 102 through bus 101 and provides graphical output for computer system 100. Input devices 106 such as a keyboard or mouse are coupled to bus 101 for communicating information and command selections to processor 102. Also coupled to processor 102 through bus 101 is an input/output interface 110 which can be used to control and transfer data to electronic devices (tablet 116, printers, other computers, etc.) connected to computer system 100. Tablet 116 may be used in conjunction with stylus 117 to transfer information to and from computer system 100. Computer system 100 includes network devices 108 for connecting computer system 100 to a network 114 through which documents may be sent and received, e.g., to and from remote device 112. Network devices 108, may include Ethernet devices, phone jacks and satellite links. It will be apparent to one of ordinary skill in the art that other network devices may also be utilized.

One embodiment of the invention may be stored entirely as a software product on mass storage 107. Another embodiment of the invention may be embedded in a hardware product, for example, in a printed circuit board, in a special purpose processor, or in a specifically programmed logic device communicatively coupled to bus 101. Still other embodiments of the invention may be implemented partially as a software product and partially as a hardware product.

Figure 3:
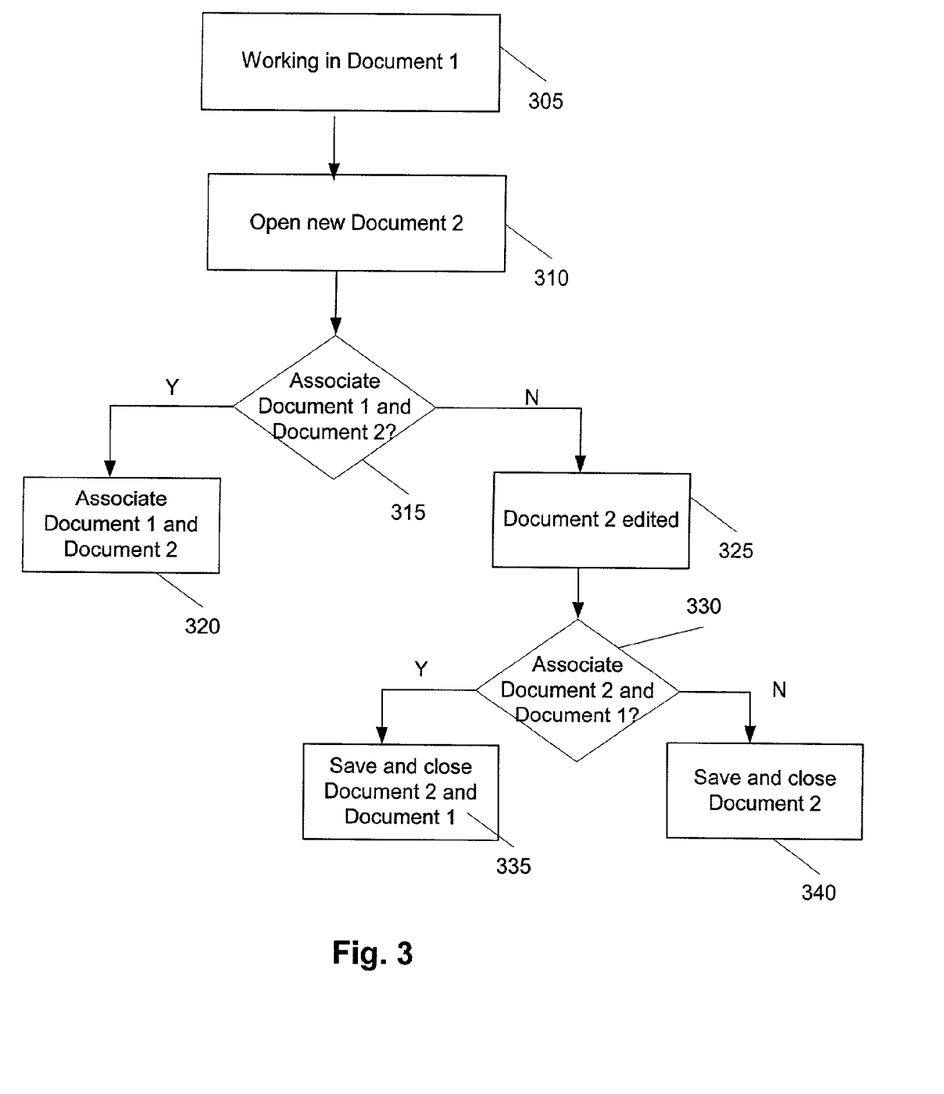
FIG. 3 illustrates a flow diagram for opening, editing, and saving applications according to one embodiment of the invention.

FIG. 3 illustrates a flow diagram for opening, editing, and saving applications according to one embodiment of the invention. As illustrated in FIG. 3, at 305 a user opens a first electronic document (e.g., a word document). At 310, the user opens a second electronic document (i.e., a document that is superimposed on the first document). In one embodiment, when a user opens the first electronic document the user is automatically prompted by the application program that generates the second electronic document to open the second electronic document. In an alternate embodiment, at the time the first or the second electronic document is opened, the application program checks the first electronic document to determine if the first electronic document has changed since the second electronic document that is associated with it was saved. If there is a change in the first electronic document, the user is notified of the change, and provided with the option of opening a new second electronic document or opening the existing associated second electronic document. In one embodiment, when a user opens the first electronic document, the second electronic document is automatically opened and vice versa. At 315, either when the second document is opened or at any time thereafter the user is provided with the option of associating the document opened at 305 (i.e., the first electronic document) with the second electronic document opened at 310. At 320, the user associates the first electronic document with superimposed second electronic document. If the user chooses not to associate the first electronic document with the second electronic document, at 325 the user edits the second electronic document. At 330, prior to saving the second electronic document, a user may via the menu bar in the second electronic document associate the second electronic document with the first electronic document. If a user associates the first electronic document with the second electronic document, at 335 the user may save and/or close the first electronic document along with the second electronic document. In one embodiment, once the two electronic documents are associated, when the first electronic document is opened for editing, the second electronic document is optionally automatically opened. If a user chooses not to associate the first electronic document with the second electronic document, at 340, the user may close the second electronic document without associating the two electronic documents.

Figure 4:
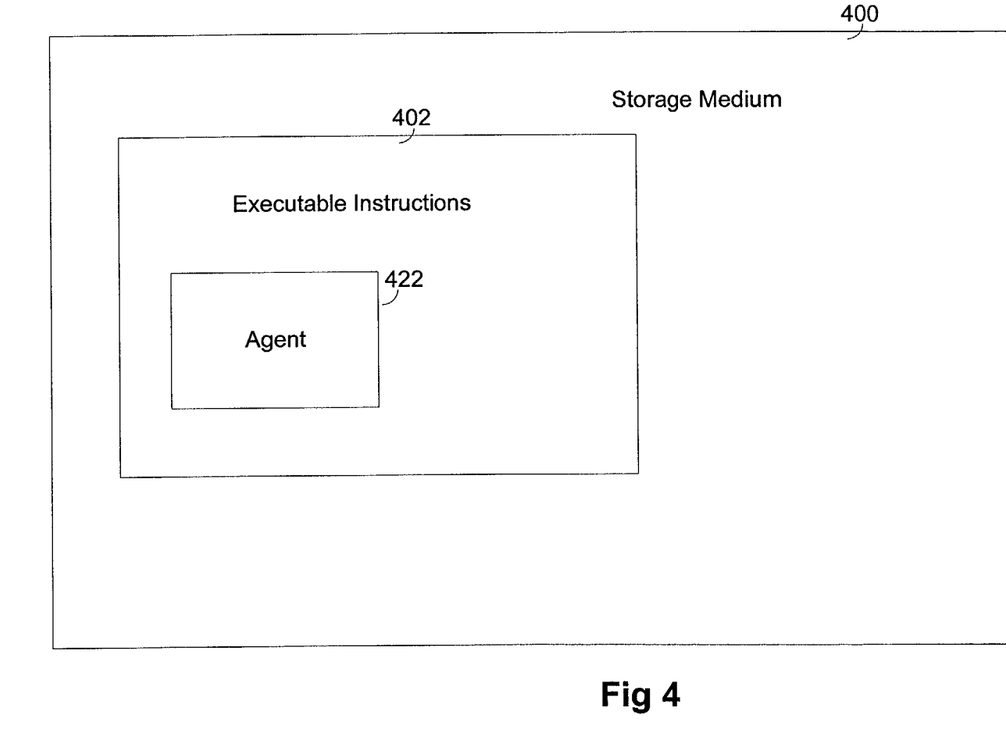
FIG. 4 illustrates a block diagram of a machine accessible medium according to one embodiment of the invention.

FIG. 4 illustrates one embodiment of the invention stored on a machine-accessible medium. Embodiments of the invention may be represented as a software product stored on a machine-accessible medium 400 (also referred to as a computer-accessible medium or a processor-accessible medium). The machine-accessible medium 400 may be any type of magnetic, optical, or electrical storage medium including a diskette, CD-ROM, memory device (volatile or non-volatile), or similar storage mechanism. The machine-accessible medium may contain various sets of instructions 402, code sequences, configuration information, or other data. Those of ordinary skill in the art will appreciate that other instructions and operations necessary to implement the described invention may also be stored on the machine-accessible medium.

The machine-accessible medium comprises instructions, incorporated in agent 422, that when executed by a machine causes the machine to perform operations comprising marking-up an electronic document (i.e., a second electronic document) that is superimposed on a first electronic document (e.g., a word processing document) keeping the first electronic document unchanged. Providing an option to view the second electronic document concurrently with the first electronic document. The second electronic document is capable of being viewed or modified using different application programs so long as the different application programs process the format used by the second electronic document. Processing the format used by the second electronic document implies the application recognizing the format used by the second electronic document (e.g., the PDF). The second electronic document is saved as a separate document independent of the first electronic document. Furthermore, the application programs that permit the second electronic document to be viewed or modified may be operational on machines that use the same operating system as the machine that created the second electronic document. Alternately, the application programs that permit the second electronic document to be viewed or modified may be operational on machines that use a different operating system so long as the application programs process the format of the second electronic document.

Thus a method and apparatus have been disclosed for annotating an electronic document that includes marking-up an electronic document (i.e., a second electronic document) that is superimposed on a first electronic document (e.g., a word processing document) keeping the integrity of the first electronic document unchanged. While there has been illustrated and described what are presently considered to be example embodiments of the present invention, it will be understood by those skilled in the art that various other modifications may be made, and equivalents may be substituted, without departing from the true scope of the invention. Additionally, many modifications may be made to adapt a particular situation to the teachings of the present invention without departing from the central inventive concept described herein. Therefore, it is intended that the present invention not be limited to the particular embodiments disclosed, but that the invention include all embodiments falling within the scope of the appended claims.

What is claimed is:

1. A method, comprising:
    opening a first electronic document;
    creating a second electronic document superimposed over the first electronic document to receive annotations in reference to the first electronic document;
    creating, in response to creating the second electronic document to receive annotations, an association between the first electronic document and the second electronic document;
    saving the second document as a separate document independent of the first document;
    in response to a second opening of the first electronic document, and based upon the association between the first electronic document and the second electronic document that was annotated during a previous viewing of the first electronic document, automatically opening the second electronic document without user intervention;
    superimposing the second electronic document with the annotations over the first electronic document; and
    receiving additional annotations in reference to the first electronic document within the second electronic document concurrently while viewing the first electronic document beneath the second electronic document.

2. The method of claim 1, further comprising copying at least a portion of the first electronic document into at least a portion of the second electronic document.

3. The method of claim 1, wherein the first electronic document and second electronic document are of a same file type.

4. The method of claim 1, further comprising in response to scrolling the second electronic document, concurrently scrolling the first electronic document.

5. The method of claim 1, wherein the association between the first electronic document and the second electronic document is based on a user input.

6. The method of claim 1, wherein the first electronic document is a word processing file.

7. The method of claim 1, wherein the first electronic document is a spreadsheet file.

8. The method of claim 7, wherein the second electronic document is a portable document format (PDF) file.

9. The method of claim 1, wherein the first electronic document is a word processing file and the second electronic document is a portable document format (PDF) file.

10. The method of claim 1, further comprising:
    receiving an input creating a marked portion of the first electronic document within the second electronic document; and
    copying content corresponding to the marked portion of the first electronic document into a corresponding portion of the second electronic document.

11. A non-transitory computer-readable medium having stored thereon instructions that are executable to cause a computer system to perform operations comprising:
    opening a first electronic document;
    creating a second electronic document superimposed over the first electronic document to receive annotations in reference to the first electronic document;
    creating, in response to creating the second electronic document to receive annotations, an association between the first electronic document and the second electronic document;
    saving the second document as a separate document independent of the first document;
    in response to a second opening of the first electronic document, and based upon the association between the first electronic document and the second electronic document that was annotated during a previous viewing of the first electronic document, automatically opening the second electronic document without user intervention;
    superimposing the second electronic document with the annotations over the first electronic document; and
    receiving additional annotations in reference to the first electronic document within the second electronic document concurrently while viewing the first electronic document beneath the second electronic document.

12. The non-transitory computer-readable medium of claim 11, wherein the operations further comprise copying at least a portion of the first electronic document into at least a portion of the second electronic document.

13. The non-transitory computer-readable medium of claim 11, wherein the first electronic document and second electronic document are of a same file type.

14. The non-transitory computer-readable medium of claim 11, wherein the operations further comprise in response to scrolling the second electronic document, concurrently scrolling the first electronic document.

15. The non-transitory computer-readable medium of claim 11, wherein the association between the first electronic document and the second electronic document is based on a user input.

16. The non-transitory computer-readable medium of claim 11, wherein the first electronic document is a word processing file.

17. The non-transitory computer-readable medium of claim 11, wherein the first electronic document is a spreadsheet file.

18. The non-transitory computer-readable medium of claim 17, wherein the second electronic document is a portable document format (PDF) file.

19. The non-transitory computer-readable medium of claim 11, wherein the first electronic document is a word processing file and the second electronic document is a portable document format (PDF) file.

20. The non-transitory computer-readable medium of claim 11, wherein the operations further comprise:
receiving an input creating a marked portion of the first electronic document within the second electronic document; and
copying content corresponding to the marked portion of the first electronic document into a corresponding portion of the second electronic document.

21. A computer system, comprising:
a processor; and
a data storage device having stored thereon instructions which, when executed by the processor, cause the computer system to perform operations comprising:
opening a first electronic document;
creating a second electronic document superimposed over the first electronic document to receive annotations in reference to the first electronic document;
creating, in response to creating the second electronic document to receive annotations, an association between the first electronic document and the second electronic document;
saving the second document as a separate document independent of the first document;
in response to a second opening of the first electronic document, and based upon the association between the first electronic document and the second electronic document that was annotated during a previous viewing of the first electronic document, automatically opening the second electronic document without user intervention;
superimposing the second electronic document with the annotations over the first electronic document; and
receiving additional annotations in reference to the first electronic document within the second electronic document concurrently while viewing the first electronic document beneath the second electronic document.

22. The computer system of claim 21, wherein the operations further comprise copying at least a portion of the first electronic document into at least a portion of the second electronic document.

23. The computer system of claim 21, wherein the first electronic document and second electronic document are of a same file type.

24. The computer system of claim 21, wherein the operations further comprise in response to scrolling the second electronic document, concurrently scrolling the first electronic document.

25. The computer system of claim 21, wherein the operations further comprise: associating the first electronic document with the second electronic document based on user input.

26. The computer system of claim 21, wherein the first electronic document is a portable document format (PDF) file.

27. The computer system of claim 26, wherein the second electronic document is a PDF file.

28. The computer system of claim 21, wherein the first electronic document is a word processing file and the second electronic document is a portable document format (PDF) file.

29. The computer system of claim 21, wherein the first electronic document is a spreadsheet file and the second electronic document is a portable document format (PDF) file.

30. The computer system of claim 21, wherein the operations further comprise:
receiving an input creating a marked portion of the first electronic document within the second electronic document; and
copying content corresponding to the marked portion of the first electronic document into a corresponding portion of the second electronic document.

* * * * *